United States Patent [19]

Matin

[11] 4,071,874
[45] Jan. 31, 1978

[54] HAMMER PROTECTION CIRCUIT

[75] Inventor: Fereidoon Matin, Pleasant Hill, Calif.

[73] Assignee: Xerox Corporation, Stamford, Conn.

[21] Appl. No.: 700,419

[22] Filed: June 28, 1976

[51] Int. Cl.$^2$ ............................................. H02H 3/08
[52] U.S. Cl. ........................................ 361/94; 361/57;
361/100; 361/104
[58] Field of Search ................. 317/36 TD, 33 R, 31,
317/33 SC, DIG. 4, 137, 148.5 R; 361/57, 93,
94, 98, 100, 104, 86, 87

[56] References Cited

U.S. PATENT DOCUMENTS

| | | | |
|---|---|---|---|
| 3,359,434 | 12/1967 | Galluzzi | 317/33 VR X |
| 3,376,478 | 4/1968 | Sheng et al. | 317/33 VR X |
| 3,480,834 | 11/1969 | Billings | 317/36 TD X |
| 3,512,044 | 5/1970 | Jones | 317/31 X |
| 3,748,537 | 7/1973 | Vigini | 317/36 TD X |
| 3,819,986 | 6/1974 | Fukuoka | 317/33 VR X |
| 3,909,681 | 9/1975 | Campari et al. | 317/DIG. 4 X |
| 3,912,982 | 10/1975 | Fasulkey | 317/33 R |

Primary Examiner—Donovan F. Duggan
Assistant Examiner—Patrick R. Salce
Attorney, Agent, or Firm—M. J. Colitz, Jr.; T. J. Anderson; B. P. Smith

[57] ABSTRACT

A hammer protection circuit automatically disconnects a power supply from a hammer actuating coil in order to inhibit current flow through the coil when such current flow is either greater than a predetermined level or present for greater than a predetermined time period. The circuit comprises charging means coupled to the coil for charging up to a voltage level proportional to the level and duration of the current flow through the coil, comparator means coupled to the charging means for comparing the voltage level with a reference voltage and for generating an output signal when the voltage level bears a predetermined relationship toward the reference voltage, and means coupled to the comparator means and to the power supply and responsive to the output signal for disconnecting the power supply from the coil.

9 Claims, 1 Drawing Figure

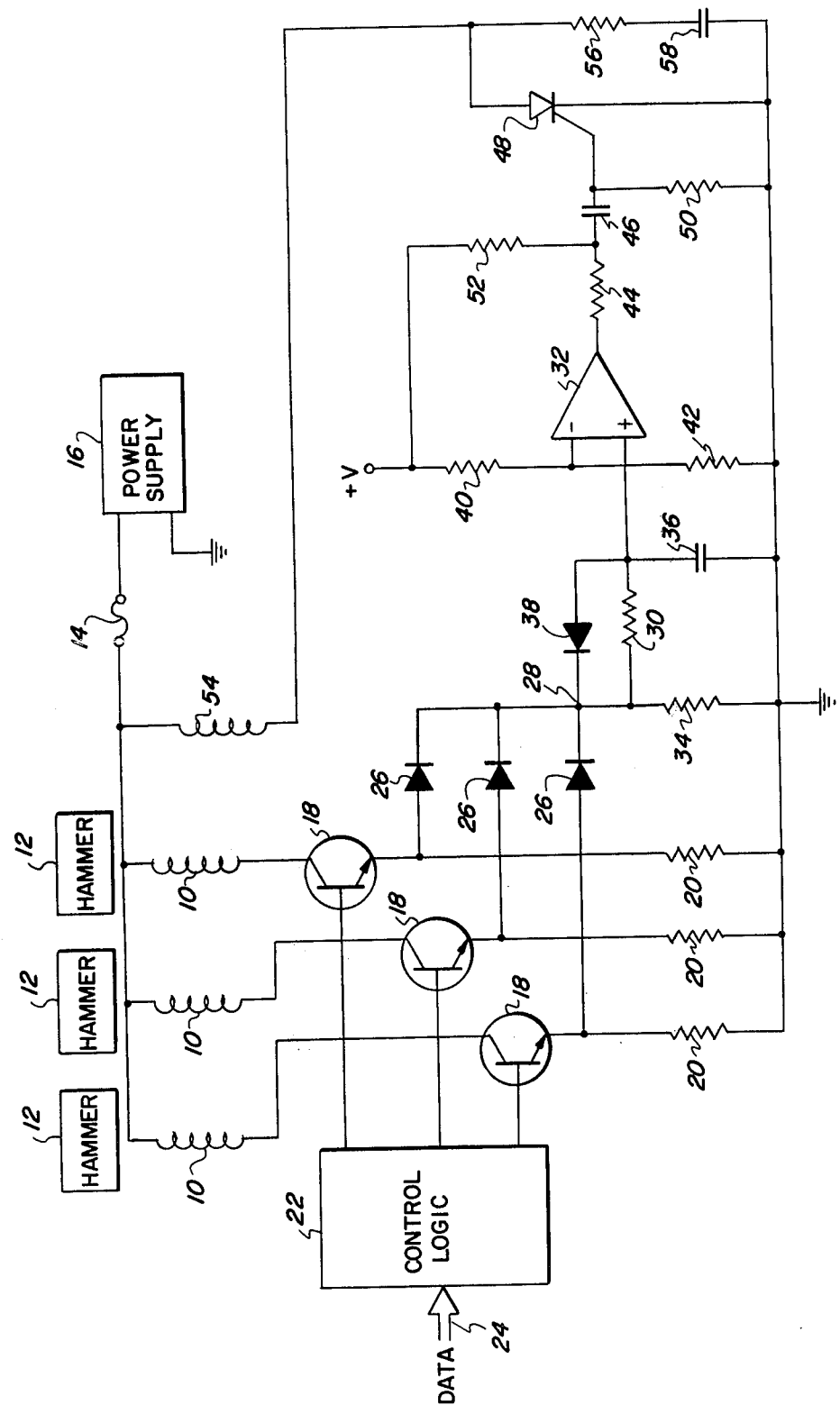

4,071,874

HAMMER PROTECTION CIRCUIT

BACKGROUND OF THE INVENTION

This invention relates to protection circuits and, more particularly, to a hammer protection circuit for automatically disconnecting a power supply from a hammer actuating coil in order to inhibit current flow through the coil when such current flow is either greater than a predetermined level or present for greater than a predetermined time period.

U.S. Pat. No. 3,589,282 discloses a hammer protection circuit which automatically disconnects a power supply from a plurality of hammer actuating coils whenever, during a period when the hammers are not being fired, i.e. when current above a predetermined threshold level is normally not supposed to flow through the coils, a current above such threshold level is monitored through any of the coils. This circuit suffers from the disadvantage of being protective only during the period following or preceeding a hammer firing period and not during such time period. Thus, if the current flow through any of the coils is excessive during a hammer firing period, the circuit will not disconnect the power supply until the end of the normal hammer firing period. Furthermore, if the logic that generates the signal representing the end of the hammer firing period fails for some reason and such signal is not generated, the power supply will remain connected even though unwanted current may still be flowing through one or more of the coils. This protection circuit is thus totally dependent upon the proper generation of a signal representing the end of a hammer firing period in order to be operative.

It would be desirable, therefore, to provide a hammer protection circuit which automatically disconnects a power supply from a hammer actuating coil either when the current flow through the coil is excessive, whether during a hammer firing period or not, or when such current flow is present for greater than a predetermined time period, e.g. is present after cessation of a normal hammer firing period.

SUMMARY OF THE INVENTION

In accordance with the present invention, a hammer protection circuit is provided for automatically disconnecting a power supply from a hammer actuating coil in order to inhibit current flow through the coil when the current flow is either greater than a predetermined level or present for greater than a predetermined time period. The circuit comprises charging means coupled to the coil for charging up to a voltage level proportional to the level and duration of the current flow through the coil, comparator means coupled to the charging means for comparing the voltage level with a reference voltage and for generating an output signal when the voltage level bears a predetermined relationship toward the reference voltage, and means coupled to the comparator means and to the power supply and responsive to the output signal for disconnecting the power supply from the coil.

Thus, if, during a normal hammer firing period, the current flow through the coil is excessive, the charging means will charge up to a voltage level exceeding the reference voltage thereby causing the power supply to be disconnected. Further, if a normal level of current continues to flow through the coil after the hammer firing period, the charging means will also charge up to a voltage level exceeding the reference voltage thereby again disconnecting the power supply from the coil. The protection circuit of the present invention is thus operative during both hammer firing and non-hammer firing periods.

These and other aspects and advantages of the present invention will be more completely described below with reference to the accompanying drawing.

BRIEF DESCRIPTION OF THE DRAWING

The single FIGURE is a schematic diagram of a hammer protection circuit of the present invention.

DESCRIPTION OF THE PREFERRED EMBODIMENT

Referring now to the single drawing FIGURE, a plurality of coils 10 are shown which are respectively associated with a plurality of hammers 12. Although only three coils and three hammers are depicted, it will be clear that this is merely exemplary. Each coil 10 desirably forms part of an electromagnetic actuating assembly (not shown) for actuating the associated hammer 12. Each hammer may, in turn, be adapted to strike and propel a character forming element (not shown) against a record medium (also not shown). For example, the coils 10 and hammers 12 may be included as part of a matrix print head of the type disclosed in copending U.S. Application No. (Attorney Docket D/76231) filed concurrently herewith in the name of Donald G. Hebert for MATRIX PRINT HEAD WITH IMPROVED ARMATURE RETAINER and assigned to the assignee of the present invention.

Each coil 10 is connected at one end through a fuse 14 to a suitable power supply 16. The other end of each coil is connected to the collector electrode of a respective one of a plurality of substantially identical transistor switches 18. The emitter electrode of each transistor switch 18 is coupled to ground through a respective one of a plurality of resistors 20, which are preferably matched. Further, the impedance characteristics of the coils 10 are desirable substantially identical as well. The base electrode of each switch 18 is connected to a control logic circuit 22. In the case of a matrix printer, characters are formed by a plurality of columns of dots. Each column is formed by simultaneously actuating selective ones of the plurality of coils 10 in order to simultaneously fire the corresponding hammers 12. Thus, the control logic circuit 22 responds to character data on a data bus 24 for simultaneously actuating selected ones of the hammers for each column of a character to be imprinted. Any suitable control logic circuit capable of functioning in the above manner may be used. A presently preferred control logic circuit is described in copending U.S. Application No. (Attorney Docket D/76319) filed concurrently herewith in the names of Robert A. Ragen and Carl E. Herendeen for FONT CONVERSION APPARATUS and assigned to the assignee of the present invention.

The manner in which a particular hammer 12 is actuated or fired is to turn on the associated transistor switch 18 in order to allow current to flow from the power supply 16, through the respective coil 10, switch 18 and resistor 20 to ground. The transistor switch 18 is turned on by applying a hammer actuating pulse of predetermined duration from the control logic 22 to the base electrode of the transistor switch 18.

Referring now to the protection portion of the circuit, the current flowing in each coil 10 is continuously monitored both during hammer firing periods and non-hammer firing periods. More specifically, a plurality of substantially identical diodes 26 are respectively coupled at their anodes to the emitter electrodes of the transistor switches 18. The cathodes of the diodes 26 are ORed at a junction point 28 which is coupled by a resistor 30 to a positive input of a conventional comparator 32, and through another resistor 34 to ground. A capacitor 36 is coupled between the positive input of comparator 32 and ground for a purpose to be described in more detail below. Further, a diode 38 is coupled at its anode to the positive input of the comparator 32 and at its cathode to the junction point 28 for a purpose also to be described below.

A source of voltage, +V, is coupled to a negative input of the comparator 32 through a resistor 40, which negative input is also coupled to ground through another resistor 42. The output of comparator 32 is coupled through a series resistor 44 and capacitor 46 to the gate electrode of a conventional silicon-controlled-rectifier (SCR) 48, which gate electrode is also coupled to ground through a resistor 50. The source voltage +V is also applied through a resistor 52 to the junction between the resistor 44 and the capacitor 46. The cathode of SCR 48 is connected directly to ground, whereas the anode is connected through an inductor 54 to fuse 14, and through a series resistor 56 and capacitor 58 to ground.

In operation, the current flow in each coil 10 is continuously monitored by the associated diode 26. The junction point 28 is essentially an OR-gate which applies the highest monitored current level flowing through any one of the coils 10 across the resistor 30. This enables the capacitor 36 to charge up to a voltage level substantially equal to the highest voltage level developed across any one of the resistors 20, which, of course, will be the voltage developed across the resistor 20 associated with the coil 10 having the highest current level flowing therethrough. Now then, the voltage across the capacitor 36 is applied to the positive input of the comparator 32. When the level of this voltage exceeds a predetermined reference voltage level present at the negative input of the comparator 32 and defined by the values of source voltage +V and resistors 40 and 42, the output of the comparator will go true, thereby turning on SCR 48. When this occurs, a short circuit current will be drawn from the power supply 16, through the fuse 14, inductor 54 and SCR 48 to ground, thereby causing the fuse to blow and the power supply to be disconnected from all of the coils 10, protecting same and the hammers 12 from damage. The inductor 54 is included to limit the short circuit current, but not to the extent that will prevent the fuse 14 from being blown.

In normal operation, during the period when one or more hammers 12 are being simultaneously fired, the current flow through the respective coils 10 is at a level such that the voltage developed across the capacitor 36 is less than the reference voltage. With this the case, the output from the comparator will remain false, thereby maintaining the SCR 48 off and preventing the fuse from blowing due to a short circuit through the SCR. The capacitor 36 will charge up to a voltage level exceeding the reference voltage if the current flowing in any one of the coils 10 is excessive during a hammer firing period, i.e. exceeds a predetermined danger current level defined by the reference voltage at the negative input to the comparator 32. Additionally, if a transistor switch 18 fails to turn off at the end of a hammer firing period due to a malfunction, the capacitor 36 will likewise charge up to a voltage level exceeding the reference voltage since it would have been charging for greater than the normal charging time period, even through the charging rate would not normally have been excessive.

When the current flow is removed from all of the coils 10, such as at the end of a hammer firing period or when the power supply 16 is disconnected due to a blown fuse 14, the capacitor 36 will discharge through the diode 38 and resistor 34 to ground.

It will be appreciated that the voltages of the power supply 16 and source voltage +V, as well as the values of the circuit components depicted, particularly that of capacitor 36, are carefully chosen to insure that an optimum normal current flow through each coil, when present for the duration of a hammer firing period only, will not cause the capacitor 36 to charge up to a voltage level exceeding the reference voltage, but that such voltage level will exceed the reference voltage whenever the current flow through any coil exceeds a predetermined danger current level at any period of time, or such current flow, even if at the optimum normal level, is present for a greater time period, such as when remaining after the cessation of a normal hammer firing period. Typical exemplary values for the voltages and various of the circuit components depicted in the drawing are set out in the chart below.

| TABLE OF EXEMPLARY VALUES | |
|---|---|
| Power Supply Voltage | +48V |
| Voltage +V | +15V |
| Resistors 20 | 1.0 |
| Resistor 30 | 3.92K |
| Resistor 34 | 390 |
| Capacitor 36 | 0.1 $\mu$f |
| Resistor 40 | 10 K |
| Resistor 42 | 1.4K |
| Resistor 44 | 33 |
| Capacitor 46 | .056$\mu$f |
| Resistor 50 | 510 |
| Resistor 52 | 510 |
| Resistor 56 | 15 |
| Capacitor 58 | 0.1$\mu$f |

Although the present invention has been described with respect to a presently preferred embodiment, it will be appreciated by those skilled in the art that various modifications, substitutions, etc. may be made without departing from the spirit and scope of the invention as defined in and by the following claims.

What is claimed is:

1. A hammer protection circuit for automatically disconnecting a power supply from a hammer actuating coil in order to cut-off current flow through said coil when said current flow is either greater than a predetermined level or present for greater than a predetermined time interval, said circuit comprising:
   charging means coupled to said coil for charging up to a voltage level proportional to the level and duration of said current flow through said coil;
   comparator means coupled to said charging means for comparing said voltage level with a reference voltage and for generating an output signal when said voltage level bears a predetermined relationship toward said reference voltage; and
   means coupled to said comparator means and to said power supply and responsive to said output signal for disconnecting said power supply from said coil.

2. The hammer protection circuit of claim 1, wherein said charging means includes a capacitor.

3. The hammer protection circuit of claim 1, wherein said comparator means includes a first input coupled to said charging means and a second input coupled to a source of said reference voltage.

4. The hammer protection circuit of claim 1, wherein said means for disconnecting includes first switch means coupled to the output of said comparator and second switch means coupled between said first switch means and said power supply, said first switch means changing state in response to the presence of the output signal from said comparator, and said second switch means changing state in response to said first switch means changing state in order to disconnect said power supply from said coils.

5. The hammer protection circuit of claim 4, wherein said first switch means comprises a rectification device.

6. The hammer protection circuit of claim 4, wherein said second switch means comprises a fuse.

7. The hammer protection circuit of claim 6, wherein said first switch means comprises a silicon-controlled-rectifier.

8. The hammer protection circuit of claim 7, wherein said charging means includes a capacitor.

9. The hammer protection circuit of claim 8, wherein said comparator means includes a first input coupled to said capacitor and a second input coupled to a source of said reference voltage.

* * * * *